United States Patent
Yen et al.

(10) Patent No.: US 7,706,492 B2
(45) Date of Patent: Apr. 27, 2010

(54) METHOD AND APPARATUS FOR CORRECTING SYMBOL TIMING

(75) Inventors: Kuang-Yu Yen, Tai-Chung (TW); Chien-Liang Tsai, Taipei Hsien (TW); Hou-Wei Lin, Taipei (TW); Yi-Lin Li, Kao-Hsiung (TW)

(73) Assignee: Realtek Semiconductor Corp., HsinChu (TW)

( * ) Notice: Subject to any disclaimer, the term of this patent is extended or adjusted under 35 U.S.C. 154(b) by 926 days.

(21) Appl. No.: 11/424,537

(22) Filed: Jun. 15, 2006

(65) Prior Publication Data

US 2006/0285616 A1 Dec. 21, 2006

(30) Foreign Application Priority Data

Jun. 16, 2005 (TW) .............................. 94120013 A

(51) Int. Cl.
*H04L 7/00* (2006.01)
(52) U.S. Cl. ..................... 375/355; 714/700; 714/746; 714/758; 714/789; 375/354
(58) Field of Classification Search ................. 375/355, 375/240.27; 714/700, 746
See application file for complete search history.

(56) References Cited

U.S. PATENT DOCUMENTS

| | | | | |
|---|---|---|---|---|
| 4,344,176 A | * | 8/1982 | Qureshi | 375/235 |
| 5,228,060 A | * | 7/1993 | Uchiyama | 375/316 |
| 5,412,565 A | * | 5/1995 | Boser et al. | 708/7 |
| 5,585,975 A | * | 12/1996 | Bliss | 360/65 |
| 5,675,612 A | * | 10/1997 | Solve et al. | 375/326 |
| 6,091,787 A | * | 7/2000 | Westfall | 375/340 |
| 6,731,697 B1 | * | 5/2004 | Boccuzzi et al. | 375/326 |
| 6,986,080 B2 | * | 1/2006 | Kim et al. | 714/700 |
| 7,221,715 B2 | * | 5/2007 | Ahn | 375/294 |
| 7,233,270 B2 | * | 6/2007 | Lin | 341/118 |
| 2003/0161393 A1 | * | 8/2003 | Ahn | 375/224 |
| 2005/0047537 A1 | * | 3/2005 | Cheng | 375/355 |
| 2005/0141660 A1 | * | 6/2005 | Kim | 375/355 |
| 2005/0195922 A1 | * | 9/2005 | Maeda et al. | 375/341 |

(Continued)

OTHER PUBLICATIONS

[K. H. Mueller and M. Muller], [Timing recovery in digital synchronous data receivers]. [IEEE Trans Communications]. [May 1976], [516-531], [vol. com-24], [publisher], [city and/or country where publishe others.

(Continued)

*Primary Examiner*—Chieh M Fan
*Assistant Examiner*—Santiago Garcia
(74) *Attorney, Agent, or Firm*—Winston Hsu

(57) ABSTRACT

The present invention provides a method and apparatus for correcting symbol timing of a receiver. The receiver receives a signal transmitted by a transmitter based on a symbol period. The method includes: sampling the signal with a sampling period to generate N sampled data in series, wherein the sampling period is half the symbol period; from $K^{th}$ data of the N sampled data, getting M data to serve as a first data set; performing a timing recovery algorithm upon the first data set to generate a first timing metric; from ($K^{th}$+1) data of the N sampled data, getting M data to serve as a second data set; performing the timing recovery algorithm upon the second data set to generate a second timing metric; and correcting the symbol timing according to the first and second timing metrics.

12 Claims, 5 Drawing Sheets

U.S. PATENT DOCUMENTS

2005/0207519 A1* 9/2005 Phang et al. ............... 375/354
2005/0226316 A1* 10/2005 Higashino et al. ........... 375/233
2005/0249275 A1* 11/2005 Yen et al. .................... 375/232
2005/0286661 A1* 12/2005 Kwak ......................... 375/343
2007/0092047 A1* 4/2007 Amizic et al. ............... 375/355
2007/0110129 A1* 5/2007 Asada ........................ 375/142
2008/0219383 A1* 9/2008 Koslov ....................... 375/326
2008/0240325 A1* 10/2008 Agazzi et al. ............... 375/371

OTHER PUBLICATIONS

[F Gardner], [A BPSK/QPSK Timing-error detector for sampled receivers], [IEEE Trans Communications], [May 1986], [423-429]. [vol. com-34], [publisher], [city and/or country where published]others.

* cited by examiner

METHOD AND APPARATUS FOR CORRECTING SYMBOL TIMING

BACKGROUND OF THE INVENTION

1. Field of the Invention

The present invention relates to a method for correcting symbol timing and the apparatus thereof, especially to a method for correcting the symbol timing of a receiver and the corresponding apparatus.

2. Description of the Prior Art

In the field of digital communication, the transmitter transmits signals carrying digital data to a receiver with a specific symbol timing $T_1$. After receiving the signals, the receiver recovers the digital data by sampling the signals according to a specific symbol timing $T_2$. If the symbol timing of the receiver $T_2$ is the same as the symbol timing of the transmitter $T_1$, and no phase delay between the two timings, the receiver will recover the digital data correctly. Oppositely, if the symbol timing $T_2$ is different from the symbol timing $T_1$, or having phase delay between the two timings, the receiver will not recover the digital data correctly. Accordingly, a critical mechanism is required to be set in the receiver for ensuring that the symbol timing $T_2$ of the transmitter is synchronizing with the symbol timing $T_1$ or that the timing reference of the receiver has a certain relation to the timing reference of the transmitter by signal processing.

Generally speaking, for synchronizing the symbol timing $T_2$ of the receiver with the symbol timing $T_1$ of the transmitter, the receiver calculates the sampled data by utilizing a timing recovery algorithm (TR algorithm) to obtain timing metrics, which are related to the difference of the timing references (i.e., the timing error) of the transmitter and the receiver, and are advantageously utilized to correct the symbol timing of the sampling circuit of the receiver. Once the symbol is corrected, the symbol timing $T_2$ is synchronizing with the symbol timing $T_1$ or there is a certain relation between these two timings. Please refer to the flowing journals for detailed description: K. H. Mueller and M. Muller, "Timing Recovery in Digital Synchronous Data Receivers," IEEE Trans. Communications, vol. Com-24, pp. 516-531, May 1976, and F. Gardner, "A BPSK/QPSK Timing-Error Detector for Sampled Receivers, "IEEE Trans. Communications, vol. Com-34, pp. 423-429, May 1986.

SUMMARY OF THE INVENTION

It is therefore an objective of the claimed invention to provide a method and an apparatus to correct a symbol timing of a receiver.

According to an embodiment of the claimed invention, a method for correcting a symbol timing of a receiver is disclosed. The receiver receives a signal transmitted from a transmitter with a symbol period. The method comprises: sampling the signal with a sampling period to generate N sampled data in sequence, wherein the sampling period is the half of the symbol period, and N is a positive integer; selecting M data from a $K^{th}$ data of the N sampled data to be a first data set according to a timing recovery algorithm (TR algorithm), wherein K and M are positive integers; calculating the first data set to generate a first timing metric according to the TR algorithm; selecting M data from a $(K^{th}+1)$ data of the N sampled data to be a second data set according to the TR algorithm, wherein K+M is less than N; calculating the second data set to generate a second timing metric according to the TR algorithm; and correcting the symbol timing according to the first and the second timing metrics.

According to another embodiment of the claimed invention, an apparatus for correcting a symbol timing of a receiver is disclosed. The receiver receives a signal transmitted from a transmitter based on a symbol period. The apparatus comprises a sampling circuit, a timing error detector, and a symbol timing correction circuit. The sampling circuit samples the signal with a sampling period to generate N sampled data in sequence, wherein the sampling period is half of the symbol period, and N is a positive integer. The timing error detector, which is coupled to the sampling circuit, selects M data from a $K^{th}$ data of the N sampled data to be a first data set according to a timing recovery algorithm (TR algorithm), calculates the first data set to generate a first timing metric according to the TR algorithm, selects M data from a $(K^{th}+1)$ data of the N sampled data to be a second data set according to the TR algorithm, and calculates the second data set to generate a second timing metric according to the TR algorithm. The symbol timing correction circuit, which is coupled to the timing error detector, corrects the symbol timing according to the first and the second timing metrics.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
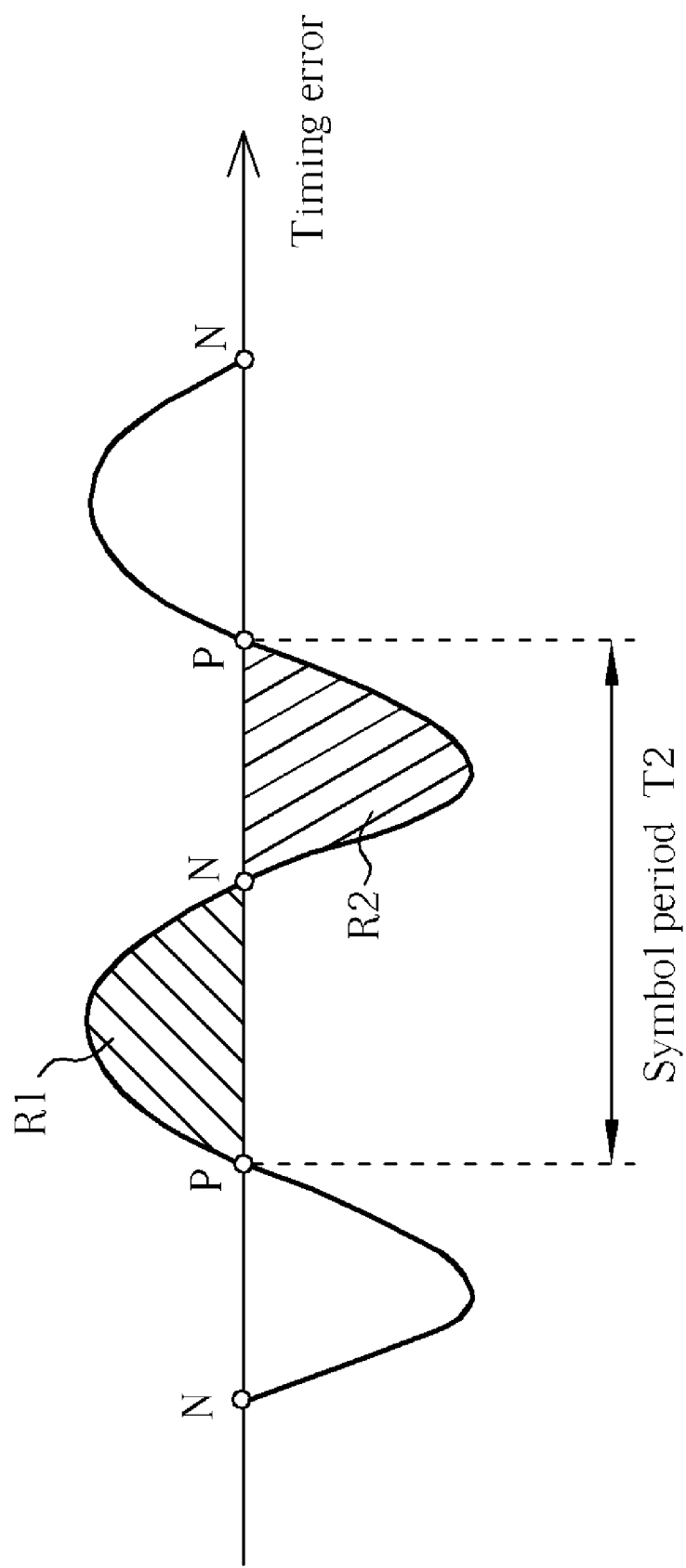
FIG. 1 shows the graph of the "S-curve".

Generally, there is a specific relationship between the average of the timing metrics and the timing error. As shown in FIG. 1, the specific relationship has a characteristic curve of an "S" shape, so this characteristic curve is often referred to as an "S-curve". The points P and points N are stable synchronous points. Since the S-curve is like a periodic curve, the sign of the average of the timing metrics is opposite in every $T_2/2$, such as the region R1 and the region R2 in FIG. 1. According to the observation mentioned above, in practical applications more timing metrics can be obtained based on the fact that the S-curve is like a periodic curve. That is, typically a timing metric is obtained every symbol period $T_2$ (i.e., a T-spaced timing metric); however, actually, a timing metric can be obtained less than a symbol period $T_2$ by shortening the sampling period, e.g., every $T_2/2$ performing a sampling process and calculating the sampled data to generate the timing metric. If a timing metric is obtained every $T_2/2$, this timing metric is referred to as a T/2-spaced timing metric.

Figure 2:
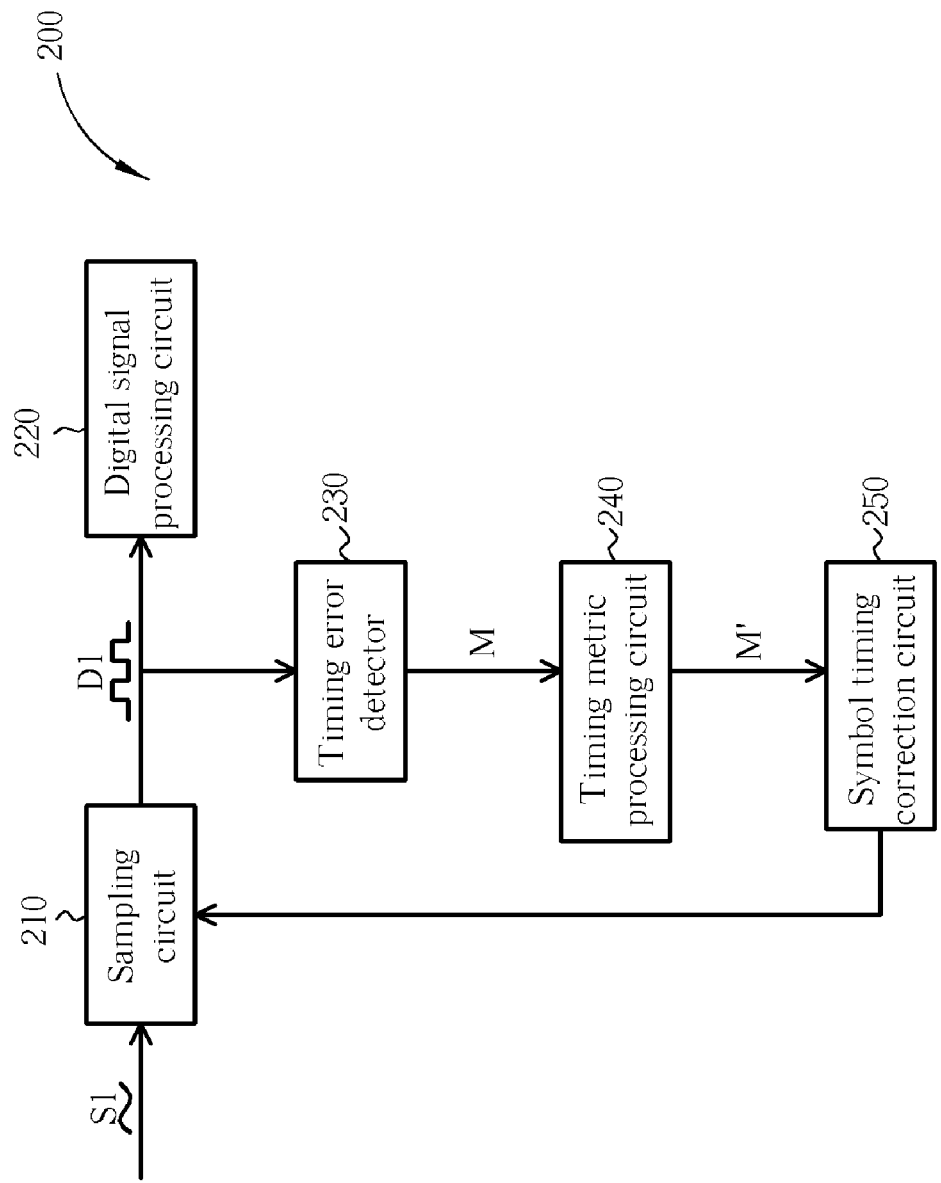
FIG. 2 shows a functional block diagram of a digital signal receiver according to an embodiment of the present invention.

Please refer to FIG. 2. FIG. 2 shows a functional block diagram of a digital signal receiver according to an embodiment of the present invention. In this embodiment, the Mueller and Muller method is taken as an example to illustrate the operational principle of the digital signal receiver 200. For a detailed description of the Mueller and Muller method please refer to K. H. Mueller and M. Muller, "Timing Recovery in Digital Synchronous Data Receivers," IEEE Trans. Communications, vol. Com-24, pp. 516-531, May 1976. After being sampled by the sampling circuit 210, the signal S1 is turned into a digital data D1. The digital data D1 is afterward transmitted to both the digital signal processing circuit 220 for further process and the timing error detector 230 for generating the timing metric. Assuming that the timing error detector 230 initially gets two data $D1[(k)T_2/2]$ and $D1[(k+2)T_2/2]$ (where k is an integer and $T_2$ being the symbol period) to generate a timing metric M1, then the timing error detector 230 gets the next two data $D1[(k+1)T_2/2]$ and $D1[(k+3)T_2/2]$, which are respectively sampled with a $T_2/2$ delay with respect to the former two data, to generate the next timing metric M2. According to the S-curve statistically, the signs of the timing metric M1 and the timing metric M2 are opposite, and therefore a timing metric processing circuit 240 is required to process the timing metric M1 and the timing metric M2 in advance. Afterward, the result M' generated from the timing metric processing circuit 240 is transmitted to a symbol timing correction circuit 250, which utilizes the result M' as a reference information to correct symbol timing.

Figure 3:
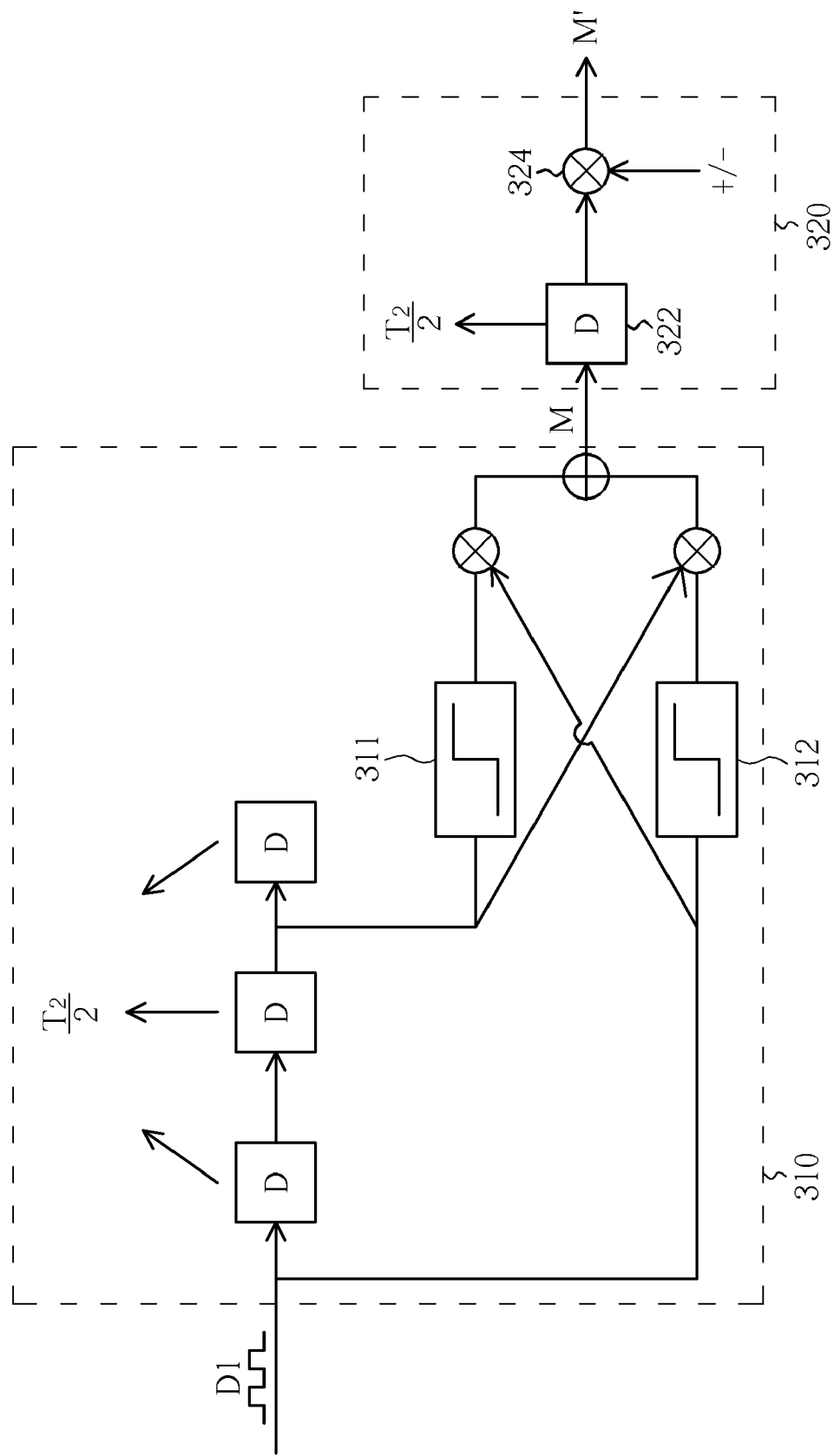
FIG. 3 shows a circuitry of the timing error detector 230 and the timing metric processing circuit 240 according to a first embodiment of the present invention.

Please refer to FIG. 3. FIG. 3 shows a circuitry of the timing error detector 230 and the timing metric processing circuit 240 according to a first embodiment of the present invention. In this embodiment, a timing error detector 310 includes quantizers 311 and 312. After timing error detector 310 processes the digital data D1, and timing metric M is generated. The timing metric M is transmitted to the timing metric processing circuit 240 and then a result M' is generated. The result M' is transmitted to the symbol timing correction circuit 250 for further processing. The timing error detector 310 utilizes the Mueller and Muller method architecture, and use T2/2 delay time for delaying the digital data D1 to get the correct symbol timing more effectively. On the other hands, based on the characteristic of the S-curve, the timing metric processing circuit 320 is modified to obtain more effective timing metrics compared to the timing metric processing circuit of prior art. The delay time of the delay circuit 322 is modified from T2 to T2/2 and allocated behind the delay circuit 322 is a multiplier 324, which receives timing metrics M and multiplies the timing metrics M by 1 and −1 in turn, i.e., the sign in one of two incoming timing metrics will be changed. Originally, only one timing metric M is obtained in one symbol period T2; however, by modifying the timing metric processing circuit 320, more timing metrics M can be obtained in one symbol period T2. Because that one timing metric M is obtained in less than one symbol period T2, the symbol timing correction becomes more efficient.

Figure 4:
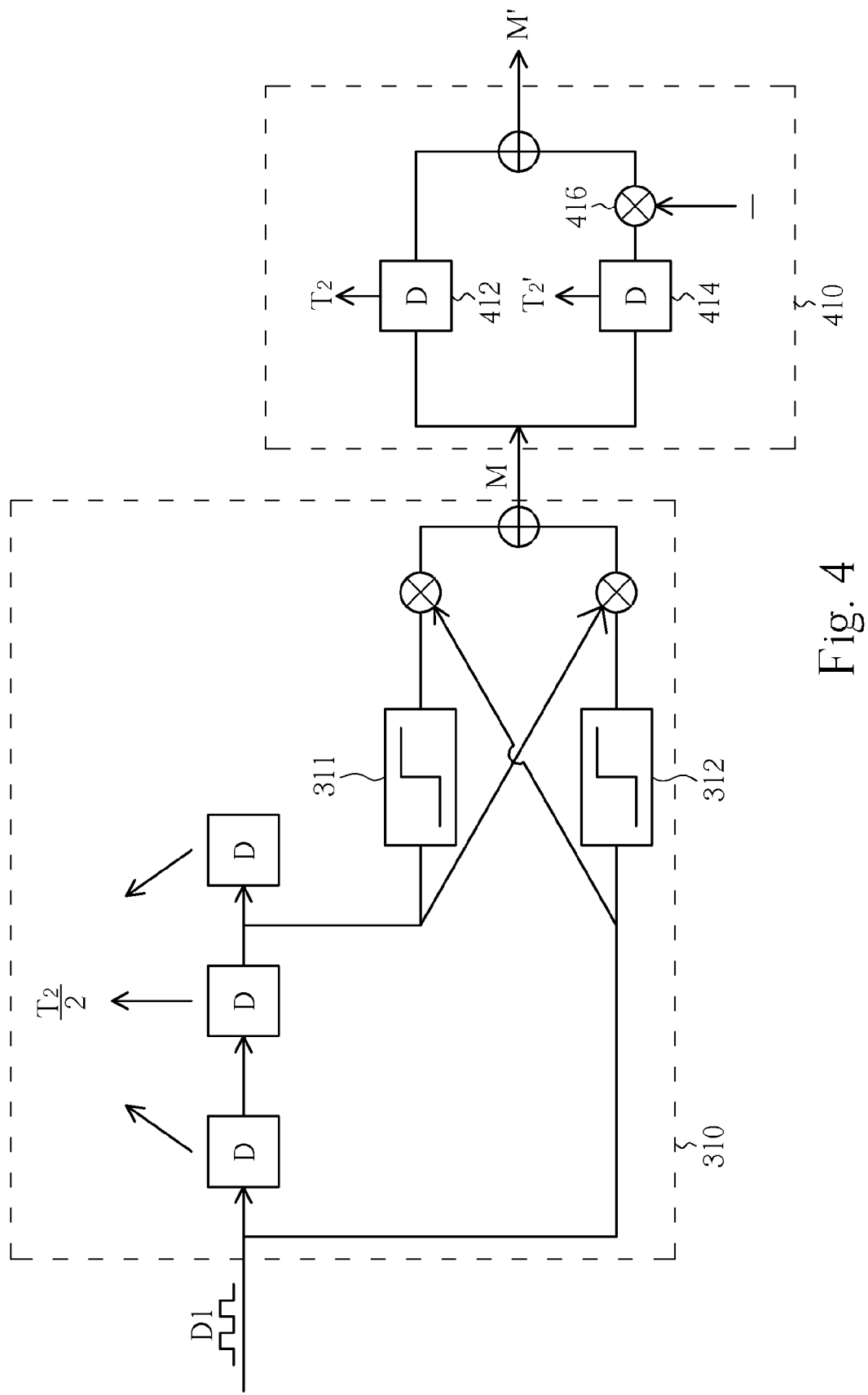
FIG. 4 shows a circuitry of the timing error detector 230 and the timing metric processing circuit 240 according to a second embodiment of the present invention.

Please refer to FIG. 4. FIG. 4 shows a circuitry of the timing error detector 230 and the timing metric processing circuit 240 according to a second embodiment of the present invention. In this embodiment, the timing error detector 310 is the same as the mention above, and the timing metric processing circuit 410 utilizes two delay circuits 412 and 414, the delay times of which are $T_2$ and $T_2'$. The periods of the delay times $T_2$ and $T_2'$ are the same, i.e., the periods of the two delay times can both be set $T_2$, but the phase difference between the two delay times is $T_2/2$. Allocated behind the delay circuit 414 is a multiplier 416, which multiplies every timing metric passing through the multiplier 416 by −1. That is, the sign of every timing metric M changes after the timing metric passes through the delay time 414. The delay times of delay circuits 412 and 414 are both $T_2$, and the phase between them is set $T_2/2$, i.e., a timing metric is effectively obtained every $T_2/2$. Moreover, the sign of one of two successive timing metrics is changed, which corresponds to the characteristic of the S-curve. As a result, more timing metrics can be obtained within a symbol period $T_2$, i.e., a timing metric is generated within less than a symbol period $T_2$, providing a more effective correction on the symbol timing.

Figure 5:
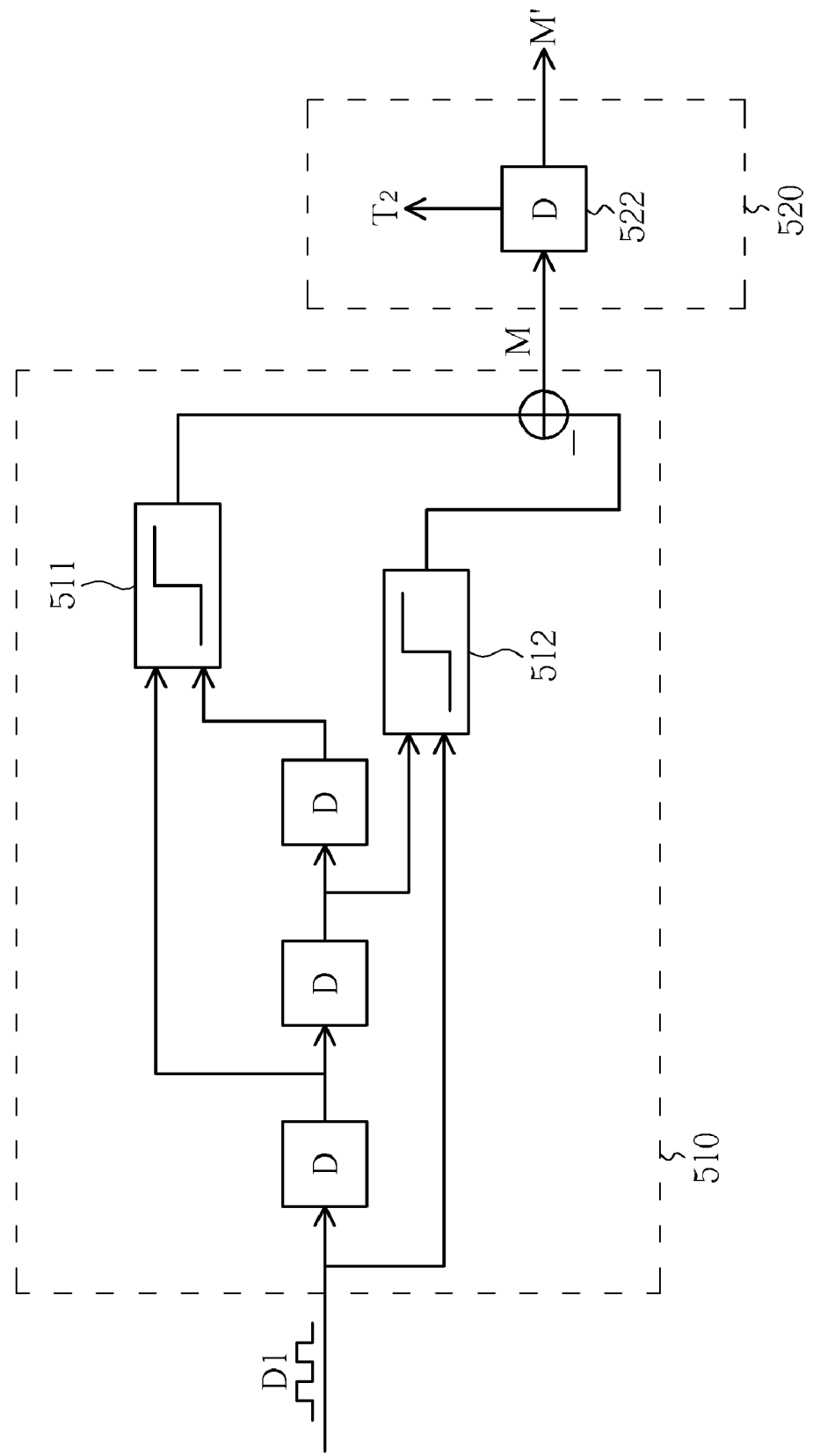
FIG. 5 shows a circuitry of the timing error detector 230 and the timing metric processing circuit 240 according to a third embodiment of the present invention.

Please refer FIG. 5. FIG. 5 shows a circuitry of the timing error detector 230 and the timing metric processing circuit 240 according to a third embodiment of the present invention. In this embodiment, a timing error detector 510 includes quantizers 511 and 512. The timing error detector 510 also adopts the same Mueller and Muller method to generate timing metrics. The timing error detector 510 changes the sign in one of two successive timing metrics, summing one timing metric and the other sign-changed timing metric to generate a result, and then outputs the result. More specifically, the timing error detector 510 gets the two data D1[(k)T2/2] and D1[(k+2)T2/2] to generate a timing metric M1, and subsequently gets the two data D1[(k+1)T2/2] and D1 [(k+3)T2/2] to generate a timing metric M2. The timing error detector 510 changes the sign of the timing metric M2 and then adds the sign-changed M2 with M1, i.e., actually, the timing error detector 510 outputs a data of M1-M2 to the timing metric processing circuit 520. The timing metric processing circuit 520 adopts a delay circuit 522 of a delay time of T2, meaning that the timing metric processing circuit 520 generates a timing metric M' every timing period T2. Each timing metric M' practically comprises information of two timing metrics (e.g., M1 and M2). As a result, the symbol timing correction circuit 250 also practically receives one timing metric M' every symbol period; however, each timing metric M' comprises more information for correction. Therefore, the symbol timing can be more effectively corrected.

According to the embodiments mentioned above, two data processing methods can be summarized referring to the timing error detector 230 and the timing metric processing circuit 240. By utilizing one of the two methods, all timing metrics can be turned into effective information.

1. Changing the sign of odd or even timing metrics (the method adopted by the first and the second embodiments). Since the fact that the S-curve is like a periodic curve implies that the signs of two timing metrics, whose phase difference is half symbol period, are opposite, the signs of all timing metrics are made the same. Therefore, the sign in one of two successive timing metrics is changed. In practical applications, it is optional to change the signs of the odd timing metrics or the even timing metrics.

2. Subtracting two successive timing metrics, i.e., subtracting the even timing metrics from the odd timing metrics or subtracting the odd timing metrics from the even timing metrics (the method adopted by the third embodiment). For example, assuming that timing metrics M[1], M[2], M[3], M[4], . . . are generated in sequence, therefore, modified timing metrics such as M[1]-M[2], M[3]-M[4], . . . or M[2]-M[1], M[4]-M[3], . . . are utilized to correct the symbol timing of the receiver.

In summary, typically only one timing metric is generated within one symbol period; however based on the method and apparatus disclosed in the present invention, a timing metric is generated within less than one symbol period. In other words, more than one timing metrics (e.g., 2 timing metrics) correspond to one symbol period. Since more timing metrics are therefore obtained, correction of the symbol timing is more effectively achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for correcting a symbol timing of a receiver, the receiver receiving a signal transmitted from a transmitter according to a symbol period, the method comprising:
   sampling the signal according to a sampling period to generate N sampled data, wherein the sampling period is half the symbol period, wherein N is a positive integer;
   selecting M data from the N sampled data to be a first data set according to a timing recovery algorithm (TR algorithm);
   calculating the first data set to generate a first timing metric according to the TR algorithm;
   selecting M data from the N sampled data to be a second data set according to the TR algorithm;
   calculating the second data set to generate a second timing metric according to the TR algorithm;
   changing the sign of the first timing metric; and
   correcting the symbol timing according to the sign changed first timing metric and the second timing metric;
   wherein the first data set comprises a $K^{th}$ data and a $K^{th}+2$) data, the second data set comprising a ($K^{th}+1$) data and a $K^{th}+3$) data; K and M are positive integers; and M is equal to or greater than 2.

2. The method of claim 1, further comprising:
   performing an operation on the sign changed first timing metric and the second timing metric to generating an operating result, and
   correcting the symbol timing according to the operating result.

3. The method of claim 1, further comprising:
   adding the sign changed first timing metric from the second timing metric to generate a third timing metric;
   wherein the step of correcting the symbol timing utilizes the third timing metric.

4. The method of claim 1, further comprising:
   adding the second timing metric from the sign changed first timing metric to generate a third timing metric;
   wherein the step of correcting the symbol timing utilizes the third timing metric.

5. The method of claim 1, wherein the TR algorithm is a Mueller and Muller method.

6. An apparatus for correcting a symbol timing of a receiver, the receiver receiving a signal transmitted from a transmitter based on a symbol period, the apparatus comprising:
   a sampling circuit for sampling the signal based on a sampling period to generate N sampled data, wherein the sampling period is half the symbol period, wherein N is a positive integer;
   a timing error detector, coupled to the sampling circuit, for
      selecting M data from the N sampled data to be a first data set according to a timing recovery algorithm (TR algorithm);
      calculating the first data set to generate a first timing metric according to the TR algorithm;
      selecting M data from the N sampled data to be a second data set according to the TR algorithm; and
      calculating the second data set to generate a second timing metric according to the TR algorithm;
   a timing metric processing circuit, coupled to the timing error detector and the symbol timing correction circuit, for changing the sign of the first timing metric; and
   a symbol timing correction circuit, coupled to the timing error detector, for correcting the symbol timing according to the sign changed first timing metric and the second timing metric;
   wherein the first data set comprises a $K^{th}$ data and a $K^{th}+2$) data, the second data set comprising a ($K^{th}+1$) data and a $K^{th}+3$) data; K and M are positive integers; and M is equal to or greater than 2.

7. The apparatus of claim 6,
   wherein the timing metric processing circuit performs an operation on the sign changed first timing metric and the second timing metric to generating an operating result and the symbol timing correction circuit corrects the symbol timing according to the operating result.

8. The apparatus of claim 6, wherein the timing metric processing circuit adds the sign changed first timing metric from the second timing metric to generate a third timing metric; and the symbol timing correction circuit corrects the symbol timing according to the third timing metric.

9. The apparatus of claim 6, wherein the timing metric processing circuit adds the second timing metric from the sign changed first timing metric to generate a third timing metric; and the symbol timing correction circuit corrects the symbol timing according to the third timing metric.

10. The apparatus of claim 6 wherein the TR algorithm is a Mueller and Muller method.

11. A method for correcting a symbol timing, the method being utilized to make a receiver receive a signal transmitted from a transmitter according to a symbol timing, and the signal corresponding to a symbol period, the method comprising:
    sampling the signal based on a sampling period to generate N sampled data in sequence, wherein the sampling period is less than the symbol period and N is a positive integer;
    selecting M data out of the N sampled data and generating a plurality of timing metrics according to the M data, M is less than N, and the step of generating a plurality of timing metrics further comprises:
       selecting P data out of the N sampled data to generate at least a first timing metric, the P data comprising a $K^{th}$ data and a $K^{th}+2$) data; and
       selecting Q data out of the N sampled data to generate at least a second timing metric the Q data comprising a ($K^{th}+1$) data and a $K^{th}+3$) data;
       wherein P, Q, K, and M are positive integers, and M is equal to or greater than 2;
    changing the sign of the first timing metric; and
    correcting the symbol timing according to the sign changed first timing metric and the second timing metric;
    wherein a symbol period averagely corresponds to more than one timing metric.

12. The method of claim 11, further comprising:
    performing an operation on the sign changed first timing metric and the second timing metric to generating an operating result, and
    correcting the symbol timing according to the operating result.

* * * * *